US012578746B2

(12) United States Patent
Sakaguchi

(10) Patent No.: US 12,578,746 B2

(45) Date of Patent: Mar. 17, 2026

(54) VOLTAGE REGULATOR AND SEMICONDUCTOR DEVICE

(71) Applicant: ABLIC Inc., Nagano (JP)

(72) Inventor: Kaoru Sakaguchi, Nagano (JP)

(73) Assignee: ABLIC Inc., Nagano (JP)

( * ) Notice: Subject to any disclaimer, the term of this patent is extended or adjusted under 35 U.S.C. 154(b) by 51 days.

(21) Appl. No.: 18/907,597

(22) Filed: Oct. 7, 2024

(65) Prior Publication Data

US 2025/0172959 A1 May 29, 2025

(30) Foreign Application Priority Data

Nov. 28, 2023 (JP) ................................ 2023-200511

(51) Int. Cl.

*G05F 1/571* (2006.01)
*G05F 1/46* (2006.01)
*G05F 1/563* (2006.01)
*G05F 1/575* (2006.01)

(52) U.S. Cl.

CPC .............. *G05F 1/571* (2013.01); *G05F 1/468* (2013.01); *G05F 1/563* (2013.01); *G05F 1/575* (2013.01)

(58) Field of Classification Search

CPC .. H02M 3/156; H02M 3/1563; H02M 3/1566; H02M 3/157; H02M 3/155; H02M 3/1552; H02M 3/1555; H02M 3/158; H02M 3/1582; H02M 3/145; H02M 3/10; H02M 3/04; H02M 3/02

See application file for complete search history.

(56) References Cited

U.S. PATENT DOCUMENTS 5,714,905 A * 2/1998 Galli .......................... H03F 1/52 327/540
9,071,047 B2 * 6/2015 Yahagi .................... G05F 1/573
9,886,045 B2 * 2/2018 Endo ........................ G05F 1/575
2004/0075488 A1 4/2004 Yamamoto et al.
2012/0194947 A1 * 8/2012 Nakashimo ............. G05F 1/573 361/18

FOREIGN PATENT DOCUMENTS

JP 2004128329 4/2004

* cited by examiner

*Primary Examiner* — Diana J. Cheng

(74) *Attorney, Agent, or Firm* — JCIPRNET

(57) ABSTRACT

A voltage regulator includes: an output transistor containing a source connected to an input port and a drain connected to an output port; voltage dividing resistors which are connected between a voltage adjustment port and a ground port, divide an adjustment voltage received at the voltage adjustment port, and output a feedback voltage; a reference voltage circuit which outputs a reference voltage; an error amplifier circuit which controls a gate voltage of the output transistor based on the reference voltage and the feedback voltage; and a disconnection protection circuit which includes a first MOS transistor containing a source connected to the output port and a gate connected to the voltage adjustment port, and detects a disconnection of a bonding wire of the voltage adjustment port.

6 Claims, 3 Drawing Sheets

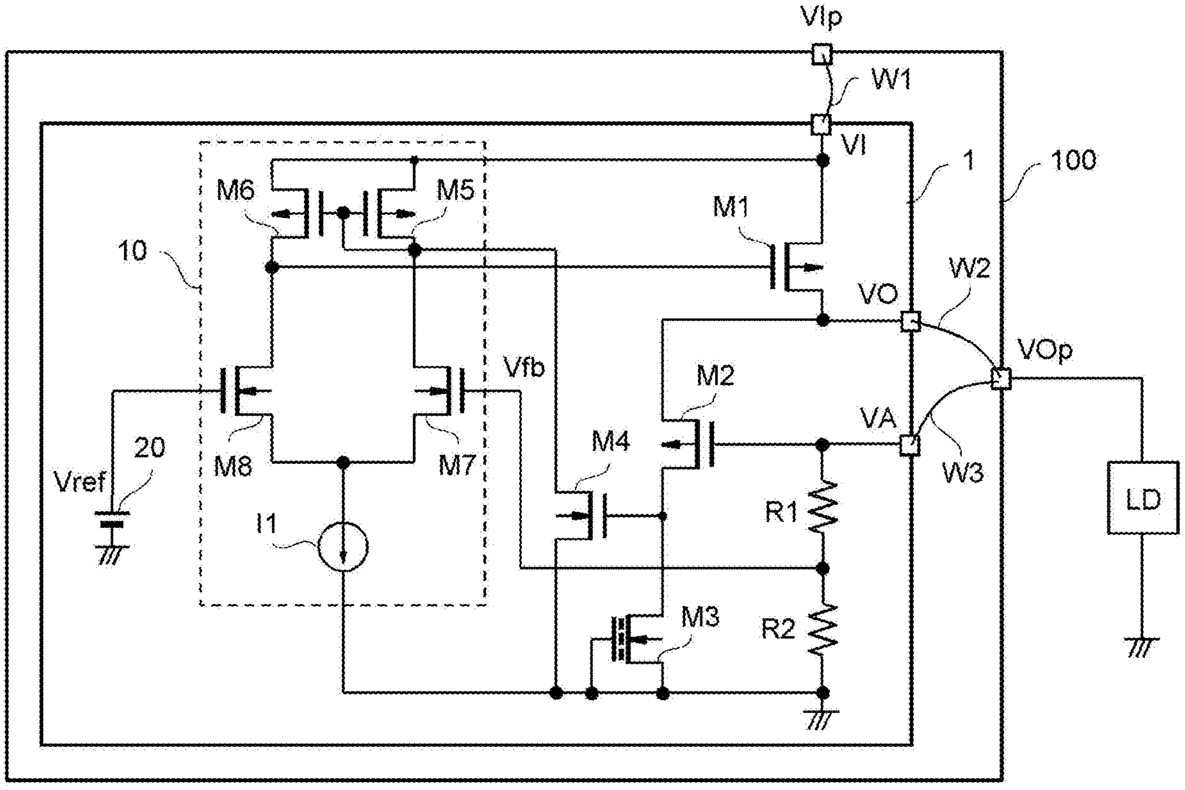
FIG. 4
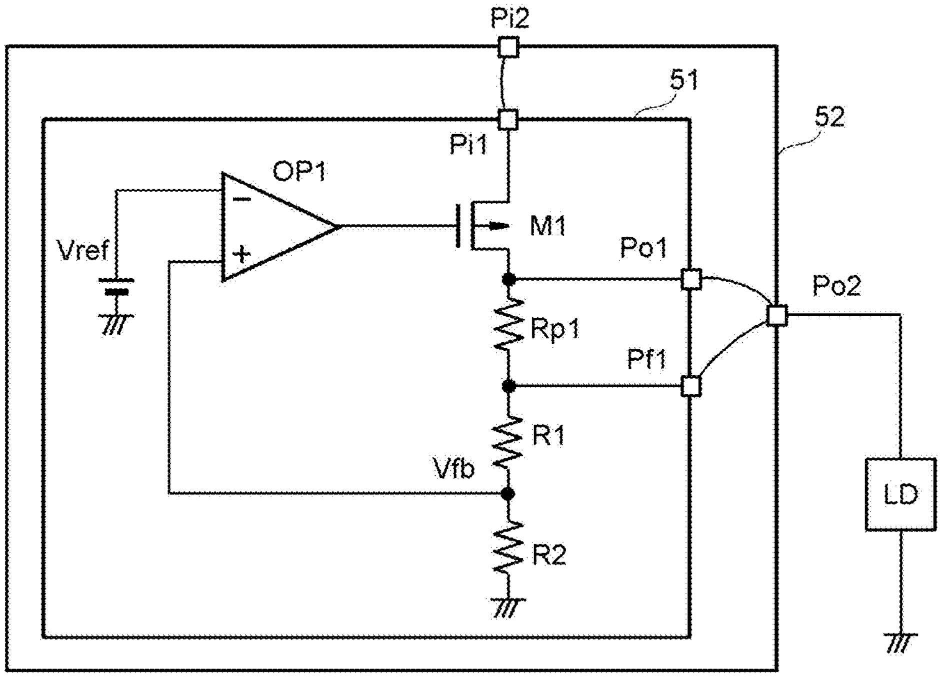
FIG. 5 (Releated Art )

VOLTAGE REGULATOR AND SEMICONDUCTOR DEVICE

CROSS-REFERENCE TO RELATED APPLICATION

This application claims the priority benefits of Japanese application no. 2023-200511, filed on Nov. 28, 2023. The entirety of the above-mentioned patent application is hereby incorporated by reference herein and made a part of this specification.

BACKGROUND

Technical Field

The present invention relates to a voltage regulator and a semiconductor device.

Description of Related Art

In general, a voltage regulator generates a constant voltage from a power supply voltage received at an input port, and outputs the constant voltage to an output port. Even if the power supply voltage or load current fluctuates, the output voltage is maintained at a constant value. A voltage regulator which is provided with a feedback voltage port in addition to the output port in order to ensure the accuracy of the output voltage in the case of the output current being large is known.

FIG. 5 illustrates a conventional voltage regulator and a conventional semiconductor device that are provided with a feedback voltage port.

A conventional voltage regulator 51 includes an operational amplifier OP1, an output transistor M1, voltage dividing resistors R1 and R2, a protective resistor Rp1, an input port Pi1, an output port Po1, and a feedback voltage port Pf1.

A semiconductor device 52 includes an input port Pi2 and an output port Po2. The output port Po2 is connected to the output port Po1 and the feedback voltage port Pf1 of the voltage regulator, and supplies a voltage to a load LD.

Since the feedback voltage port Pf1 is connected to the output port Po2, the feedback voltage port Pf1 is not affected by the output current and the voltage drop due to the bonding wire, unlike the output port Po1, and the voltage of the output port Po2 is input thereto.

The protective resistor Rp1 is connected between the output port Po1 and the feedback voltage port Pf1. In the case of a bonding wire of the feedback voltage port Pf1 being broken, the protective resistor Rp1 functions to limit the output voltage to a predetermined voltage (see, for example, Patent Literature 1 (Japanese Patent Application Laid-Open No. 2004-128329)).

However, in the conventional voltage regulator, in the case of the bonding wire of the feedback voltage port Rf1 being broken, since the protective resistor Rp1 is connected in series with the voltage dividing resistors, the output voltage becomes higher than a desired voltage value.

The present invention provides a voltage regulator capable of suppressing the generation of an excessive voltage at an output port in the case of a bonding wire of a feedback voltage port being broken.

SUMMARY

A voltage regulator according to an embodiment of the present invention receives an input voltage from an input port and outputs an output voltage to an output port. The voltage regulator includes: an output transistor containing a source connected to the input port and a drain connected to the output port; voltage dividing resistors which are connected between a voltage adjustment port and a ground port, divide an adjustment voltage received at the voltage adjustment port, and output a feedback voltage; a reference voltage circuit which outputs a reference voltage; an error amplifier circuit for controlling a gate voltage of the output transistor based on the reference voltage and the feedback voltage; and a disconnection protection circuit which includes a first MOS transistor containing a gate connected to the voltage adjustment port, and detects a disconnection of a bonding wire of the voltage adjustment port.

BRIEF DESCRIPTION OF THE DRAWINGS

FIG. 4 is a circuit diagram illustrating another example of the voltage regulator according to the embodiment of the present invention.

FIG. 5 is a circuit diagram illustrating a conventional voltage regulator and a conventional semiconductor device.

DESCRIPTION OF THE EMBODIMENTS

According to the present invention, the voltage regulator includes the disconnection protection circuit which contains the first MOS transistor containing the source connected to the output port and the gate connected to the voltage adjustment port, and detects the disconnection of the bonding wire of the voltage adjustment port, so a voltage regulator capable of suppressing the generation of an excessive voltage at the output port in the case of the voltage adjustment port being disconnected may be provided.

A voltage regulator 1 and a semiconductor device 100 according to an embodiment of the present invention will be described below with reference to the drawings.

Figure 1:
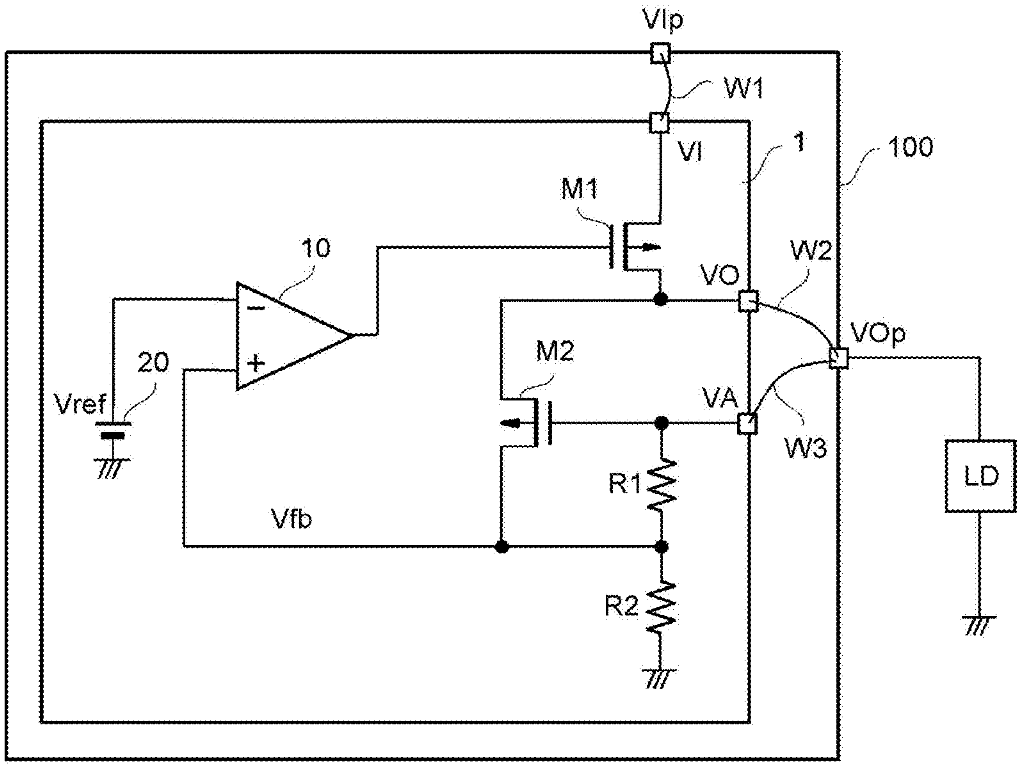
FIG. 1 is a circuit diagram illustrating an example of a voltage regulator and a semiconductor device according to an embodiment of the present invention.

FIG. 1 is a circuit diagram of the voltage regulator 1 and the semiconductor device 100 according to the embodiment.

The voltage regulator 1 includes an input port VI, an output port VO, a voltage adjustment port VA, an error amplifier circuit 10, a reference voltage circuit 20, resistors R1 and R2 which are voltage dividing resistors, an output transistor M1, and a MOS transistor M2 which is a disconnection protection circuit.

The output transistor M1 contains a source connected to the input port VI, a drain connected to the output port VO, and a gate connected to the output port of the error amplifier circuit 10. The error amplifier circuit 10 contains an inverting input port – connected to the output port of the reference voltage circuit 20, a non-inverting input port + connected to the connection point of the resistor R1 and the resistor R2 (output port of the voltage dividing resistors). The resistor R1 and the resistor R2 are connected in series between the voltage adjustment port VA and a ground port. The MOS transistor M2 contains a source connected to the output port VO, a drain connected to the output port of the voltage dividing resistors, and a gate connected to the voltage adjustment port VA.

The semiconductor device 100 includes an input port VIp and an output port VOp. The input port VIp is connected to the input port VI of the voltage regulator 1 by a bonding wire W1. The output port VOp is connected to the output port VO of the voltage regulator 1 by a bonding wire W2, and is further connected to the voltage adjustment port VA by a bonding wire W3, and supplies an output voltage VOUT to a load LD.

Since the voltage adjustment port VA is connected to the output port VOp, the voltage adjustment port VA is not affected by the voltage drop due to the output current and the wiring resistance of the bonding wire W2, as is the case with the output port VO, and the voltage of the output port VOp is input thereto.

The operation of the voltage regulator 1 will be described.

The voltage regulator 1 generates a constant voltage from an input voltage VIN received at the input port VI, and outputs the constant voltage as an output voltage VOUT from the output port VO. The resistor R1 and the resistor R2 generate a feedback voltage Vfb from an adjustment voltage VADJ input from the voltage adjustment port VA. The error amplifier circuit 10 controls a gate voltage of the output transistor M1 based on a reference voltage Vref output by the reference voltage circuit 20 and the feedback voltage Vfb. That is, the output voltage VOUT of the voltage regulator 1 is controlled to a voltage at which the feedback voltage Vfb becomes equal to the reference voltage Vref.

Next, an operation in the case of the bonding wire W3 connected to the voltage adjustment port VA being broken will be described.

In the case of the bonding wire W3 connected to the voltage adjustment port VA being broken, the adjustment voltage VADJ and the feedback voltage Vfb drop to the voltage of the ground port. The error amplifier circuit 10 controls the gate voltage of the output transistor M1 to decrease and increase the output voltage VOUT.

At this time, the MOS transistor M2 is turned on in response to the gate-source voltage becoming equal to or exceeding a threshold voltage due to an increase in the output voltage VOUT, which is the source voltage, and a decrease in the adjustment voltage VADJ, which is the gate voltage. In the case of the MOS transistor M2 being turned on, the feedback voltage Vfb increases to the output voltage VOUT.

The error amplifier circuit 10 controls the gate voltage of the output transistor M1 so that the feedback voltage Vfb received at the non-inverting input port + becomes equal to the reference voltage Vref of the reference voltage circuit 20 received at the inverting input port −. Thus, the output voltage VOUT becomes equal to the reference voltage Vref and is stabilized.

Thus, the voltage regulator 1 according to the embodiment may prevent an excessive voltage from occurring at the output port VO in the case of the bonding wire W3 connected to the voltage adjustment port VA being broken.

Furthermore, the disconnection protection circuit does not interfere with the operation of the voltage regulator 1 during normal operation.

First, before the voltage regulator 1 is started up, the output voltage VOUT and the adjustment voltage VADJ are both low voltages, so that the MOS transistor M2 is not turned on.

Next, in the case of the voltage regulator 1 being started up, the adjustment voltage VADJ also rises together with the rise in the output voltage VOUT, so that the MOS transistor M2 is not turned on. At this time, the threshold voltage of the MOS transistor M2 may be set to be equal to or less than the voltage drop from the output voltage VOUT at the time of start-up.

Figure 2:
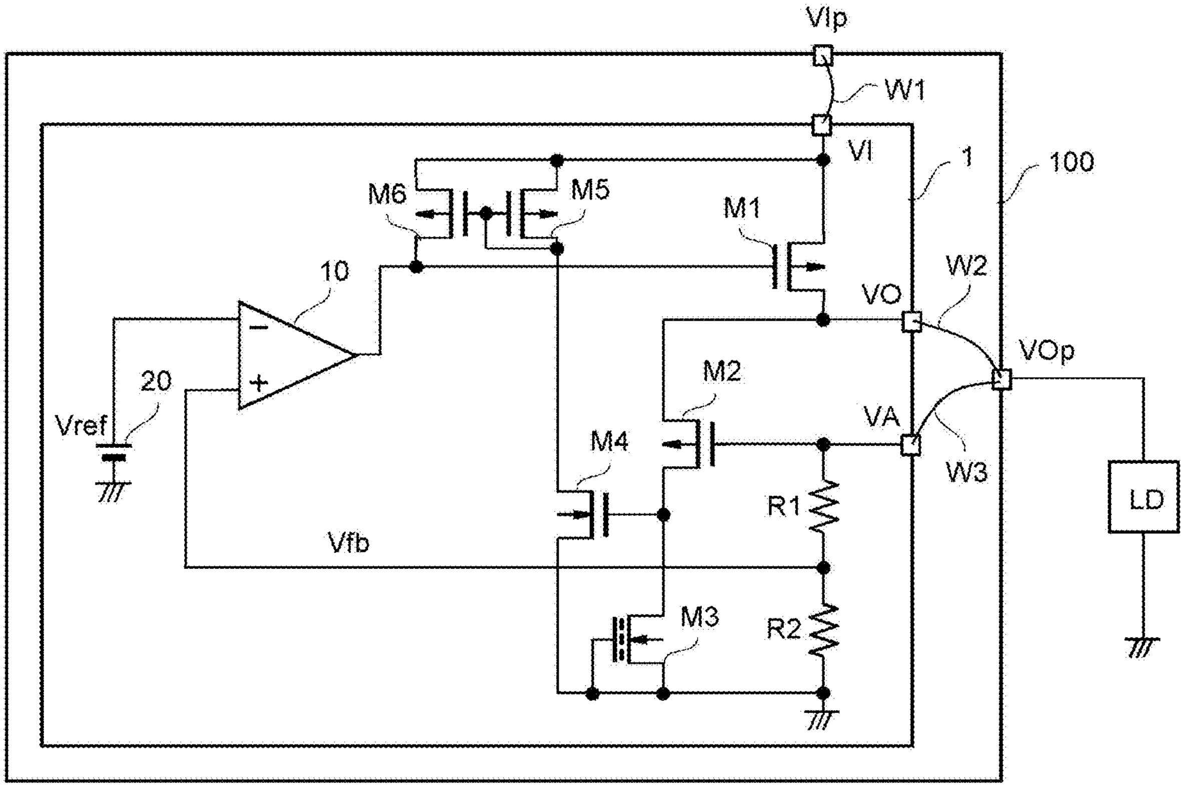
FIG. 2 is a circuit diagram illustrating another example of the voltage regulator according to the embodiment of the present invention.

FIG. 2 is a circuit diagram illustrating another example of the disconnection protection circuit of the voltage regulator 1 of the embodiment.

The disconnection protection circuit of FIG. 2 includes MOS transistors M2, M3, M4, M5, and M6. The depletion-type MOS transistor M3, which is a current source, is provided between the drain of the MOS transistor M2 and the ground port, and functions as a pull-down element. The MOS transistor M4 contains a source connected to the ground port and a gate connected to the drain of the MOS transistor M2. The MOS transistor M5 and the MOS transistor M6 form a current mirror circuit, and control the voltage of the gate of the output transistor M1 connected to the output port in response to the current passed by the MOS transistor M4 connected to the input port.

The operation in the case of the bonding wire W3 connected to the voltage adjustment port VA being broken will be described.

In the case of the bonding wire W3 connected to the voltage adjustment port VA being broken, the adjustment voltage VADJ and the feedback voltage Vfb drop to the voltage of the ground port. The error amplifier circuit 10 controls the gate voltage of the output transistor M1 to decrease and increase the output voltage VOUT.

At this time, the MOS transistor M2 is turned on in response to the gate-source voltage becoming equal to or exceeding a threshold voltage due to an increase in the output voltage VOUT, which is the source voltage, and a decrease in the adjustment voltage VADJ, which is the gate voltage. In the case of the MOS transistor M2 being turned on, the MOS transistor M4, which has been pulled down by the current of the MOS transistor M3, is turned on because the gate voltage of the MOS transistor M4 rises. Thus, the MOS transistor M4 controls the gate voltage of the output transistor M1 through the current mirror circuit of the MOS transistor M5 and the MOS transistor M6 to increase and decrease the output voltage VOUT.

Since the gate voltage of the MOS transistor M2 is the ground voltage, the MOS transistor M2 is turned off in response to the output voltage VOUT, which is the source voltage, becoming higher than the threshold voltage. Thus, the output voltage VOUT is stabilized at a voltage which is higher than the ground voltage by the threshold voltage of the MOS transistor M2.

Thus, the voltage regulator 1 according to the embodiment may prevent an excessive voltage from occurring at the output port VO in the case of the bonding wire W3 connected to the voltage adjustment port VA being broken.

Furthermore, the disconnection protection circuit does not interfere with the operation of the voltage regulator 1 during normal operation.

First, before the voltage regulator 1 is started up, the output voltage VOUT and the adjustment voltage VADJ are both low voltages, so the MOS transistor M2 is turned off, the MOS transistor M4 is also not turned on by the current of the MOS transistor M3.

Next, in the case of the voltage regulator 1 being started up, the adjustment voltage VADJ also rises together with the rise in the output voltage VOUT, so that the MOS transistor M2 is not turned on. At this time, the threshold voltage of the MOS transistor M2 may be set to be equal to or less than the voltage drop from the output voltage VOUT at the time of start-up.

Figure 3:
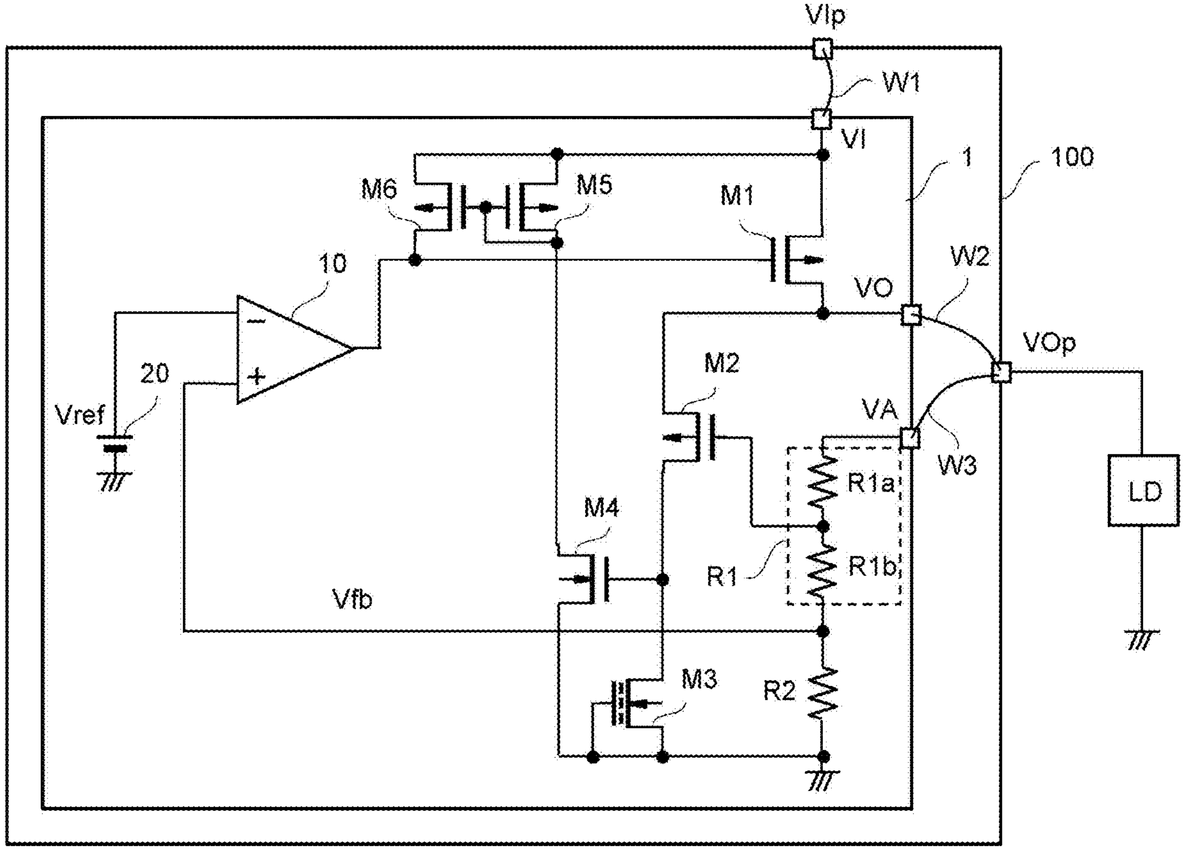
FIG. 3 is a circuit diagram illustrating another example of the voltage regulator according to the embodiment of the present invention.

FIG. 3 is a circuit diagram illustrating another example of the disconnection protection circuit of the voltage regulator 1 of the embodiment.

The voltage regulator 1 in FIG. 3 is configured such that the resistor R1 in the voltage regulator 1 in FIG. 2 is divided into a resistor R1*a* and a resistor R1*b* connected in series. The gate of the MOS transistor M2 is connected to the connection point between the resistor R1*a* and the resistor R1*b*. In response to the disconnection protection circuit being configured in such a manner, the MOS transistor M2 is turned on quickly in the case of the bonding wire W3 being broken, and overshoot of the output voltage VOUT may be suppressed.

FIG. 4 is a circuit diagram illustrating another example of the disconnection protection circuit of the voltage regulator 1 of the embodiment.

The disconnection protection circuit of FIG. 4 is configured such that the MOS transistor M5 and the MOS transistor M6 that constitute the current mirror circuit in the disconnection protection circuits of FIGS. 2 and 3 are also used as an active load of the error amplifier circuit 10. With such a configuration, the number of elements may be reduced, and thus the area of the voltage regulator 1 may be made smaller.

As described above, according to the voltage regulator 1 of the embodiment, the voltage adjustment port VA is provided with a disconnection protection circuit, even if the bonding wire W3 connected to the voltage adjustment port VA is broken, the generation of an excessive voltage at the output port VO of the voltage regulator 1 may be suppressed.

The present invention is not limited to the above-described embodiments, but may be implemented in various forms. Furthermore, various omissions, additions, replacements, or modifications may be made without departing from the spirit of the present invention. Such embodiments and their modifications are included in the scope and spirit of the present invention, and are also included in the present invention described in the claims and their equivalents.

For example, multiple resistors R1 illustrated in FIG. 3 may be connected in series, and the gate of the first MOS transistor may be connected to any one of the connection points of the resistors R1.

What is claimed is:

1. A voltage regulator which receives an input voltage from an input port and outputs an output voltage to an output port, comprising:

an output transistor, containing a source connected to the input port and a drain connected to the output port;

voltage dividing resistors, connected between a voltage adjustment port and a ground port, dividing an adjustment voltage received at the voltage adjustment port, and outputting a feedback voltage;

a reference voltage circuit, outputting a reference voltage;

an error amplifier circuit, controlling a gate voltage of the output transistor based on the reference voltage and the feedback voltage; and a disconnection protection circuit, comprising a first MOS transistor containing a source connected to the output port and a gate connected to the voltage adjustment port, and detecting a disconnection of a bonding wire of the voltage adjustment port.

2. The voltage regulator according to claim 1, wherein:

the disconnection protection circuit contains the drain of the first MOS transistor connected to an output port of the voltage dividing resistors, and reduces the output voltage to the reference voltage in the case of detecting that the bonding wire is broken.

3. The voltage regulator according to claim 1, wherein:

the disconnection protection circuit comprises a current source connected between the drain of the first MOS transistor and the ground port, a second MOS transistor containing a gate connected to the drain of the first MOS transistor and a source connected to the ground port, and a current mirror circuit containing an input port connected to a drain of the second MOS transistor and an output port connected to a gate of the output transistor, and reduces the output voltage to a voltage which is higher than the ground voltage by a threshold voltage of the first MOS transistor in the case of detecting that the bonding wire is broken.

4. The voltage regulator according to claim 3, wherein:

the voltage dividing resistors are configured by connecting a plurality of first resistors in series between the voltage adjustment port and the output port of the voltage dividing resistors, and the gate of the first MOS transistor is connected to any one of connection points of the first resistors.

5. The voltage regulator according to claim 3, wherein:

the current mirror circuit is configured to be shared with an active load of the error amplifier circuit.

6. A semiconductor device, comprising:

an input pin connected to the input port of the voltage regulator according to claim 1 and an output pin connected to the output port and the voltage adjustment port thereof.

* * * * *